US007870848B2

(12) United States Patent
Elwart et al.

(10) Patent No.: US 7,870,848 B2
(45) Date of Patent: Jan. 18, 2011

(54) REDUCING FUEL-VAPOR EMISSIONS BY VORTEX EFFECT

(75) Inventors: Shane Elwart, Ypsilanti, MI (US); Michael Igor Kluzner, Oak Park, MI (US); James Michael Kerns, Trenton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 191 days.

(21) Appl. No.: 12/024,724

(22) Filed: Feb. 1, 2008

(65) Prior Publication Data

US 2009/0194076 A1 Aug. 6, 2009

(51) Int. Cl.
*F02M 33/02* (2006.01)
*B01D 47/16* (2006.01)

(52) U.S. Cl. ....................... 123/519; 123/540; 123/518; 55/385.3; 55/459.1; 55/460; 95/269; 95/270; 95/271; 95/272; 96/301; 96/302; 96/303; 96/306

(58) Field of Classification Search ................. 123/519, 123/520, 518, 521; 55/385.3, 319, 315.1, 55/315.2, 434, 434.2, 434.3, 459.1, 460; 95/267, 269, 271, 34, 35, 40, 45, 55, 71, 95/73, 116, 120, 146, 290; 96/134, 301, 96/302, 303, 306, 307, 308
See application file for complete search history.

(56) References Cited

U.S. PATENT DOCUMENTS 4,235,845 A * 11/1980 Bose .......................... 422/171
4,409,950 A 10/1983 Goldberg
4,727,955 A 3/1988 Honda et al.
5,355,861 A * 10/1994 Arai .......................... 123/519
5,487,371 A 1/1996 Beckman et al.
5,558,069 A * 9/1996 Stay .......................... 123/541
5,957,113 A * 9/1999 Masaki et al. ............... 123/518
6,167,849 B1 1/2001 Wilson
6,237,574 B1 5/2001 Jamrog et al.
6,247,460 B1 * 6/2001 Lindberg et al. ............ 123/563
6,283,088 B1 * 9/2001 Takagi et al. ................ 123/295
6,440,317 B1 * 8/2002 Koethe ....................... 210/774
6,494,935 B2 * 12/2002 Cho et al. ..................... 95/271
6,622,665 B2 * 9/2003 Holder et al. .................. 123/3
6,932,858 B2 * 8/2005 Nicol et al. ................... 95/269
7,198,036 B2 * 4/2007 White ........................ 123/542
2001/0052292 A1 * 12/2001 Ito .............................. 96/134
2009/0025693 A1 * 1/2009 Steinman et al. ............ 123/518
2009/0266342 A1 * 10/2009 Morales ...................... 123/543

OTHER PUBLICATIONS

Crocker et al., Experimental Results of a vortex tube air aeparator for advanced space transfportation, Andrews Space Inc., AIAA 2003-4451.*

* cited by examiner

*Primary Examiner*—Stephen K Cronin
*Assistant Examiner*—Raza Najmuddin
(74) *Attorney, Agent, or Firm*—Julia Voutyras; Alleman Hall McCoy Russell & Tuttle LLP

(57) ABSTRACT

A system for managing fuel-vapor emission from a fuel tank of a vehicle using a vortex-effect flow separator coupled in the fuel-vapor purging system of the vehicle. The warmer-flow outlet of the separator is coupled to the engine intake, and the cooler-flow outlet is coupled to the fuel tank. In this way, less fuel vapor is delivered to the engine intake.

20 Claims, 6 Drawing Sheets

REDUCING FUEL-VAPOR EMISSIONS BY VORTEX EFFECT

TECHNICAL FIELD

The present application relates to the field of evaporative emission control for internal combustion engines.

BACKGROUND

Vehicle engine fuel systems may use a fuel vapor storage and purging system to reduce evaporative emissions. The system may include an adsorbent-filled canister in communication with a fuel tank, the adsorbent in the canister adsorbing fuel vapors from the fuel tank. Periodically, the system may initiate a canister purge, drawing fresh air into the adsorbent canister. This action causes adsorbed fuel in the canister to desorb and to flow as vapor into the engine intake.

One example approach for controlling fuel vapor purging is described in U.S. Pat. No. 6,237,574. Specifically, an approach is described for improving air-fuel ratio control during fuel vapor purging by smoothing the fuel-vapor spikes that occur on purging a saturated adsorbent canister when the fuel tank is simultaneously full of fuel vapor. The adsorbent canister described therein is configurable such that some of the adsorbent can be used to buffer fuel vapors drawn directly from the fuel tank.

While buffer-based methods may improve control of the air-fuel mixture under purge conditions, they may reduce the ability of the system to purge a sufficient quantity of vapors, thereby leading to increased purging time. Such increased purging time, however, may not be available due to other system requirements, such as manifold vacuum levels, adaptive learning, engine and/or cylinder deactivation, electric-propulsion operation, etc. The inventors herein have recognized the above issues and developed various approaches that may be use in addition to, or in the alternative to, such approaches.

SUMMARY

In one example, the above issues may be addressed a system for managing fuel vapors generated in a fuel system of a vehicle, the fuel system including a fuel tank. The system may include a flow separator comprising an inlet to which a gas flow having fuel vapors is admitted, at least two outlets, and an internal cavity, the inlet, the outlets, and the internal cavity configured to separate the gas flow, with at least one outlet flow becoming warmer and at least one outlet flow becoming cooler than the inlet flow, a first path coupling the warmer outlet to an engine of the vehicle, a second path coupling the cooler outlet to the fuel tank, and a third path coupling the fuel tank to the inlet. In this way, by separating the flows into a warmer and cooler vapor flow, some fuel vapors may be returned to the fuel tank, thus reducing the quantity of vapors that are delivered to the engine. Further, reduction in the magnitude of unexpected changes in the amount of vapors in the warmer flow entering the engine may thus lead to improved air-fuel ratio control, and improved tolerance to fuel vapor purging.

In another example, a flow separator and a condenser are installed in a purge line that connects a motor vehicle's adsorbent canister to its air intake. Fuel vapors drawn from the adsorbent canister during canister purge are admitted to the flow separator. In this example, the flow separator separates the purge stream into two different flows: a warmer, low-volume flow and a cooler, high-volume flow. On discharge from the flow separator, some of the fuel vapor in the cooler flow condenses in the condenser and is stored there for return to the fuel tank. Meanwhile, residual gas in the cooler flow is recombined with the warmer flow and is drawn into the intake. This stream contains reduced fuel-vapor content relative to the original purge flow because some of the original fuel vapor was condensed. After the canister has been purged, the condensed fuel is returned to the fuel tank.

DETAILED DESCRIPTION

Figure 1:
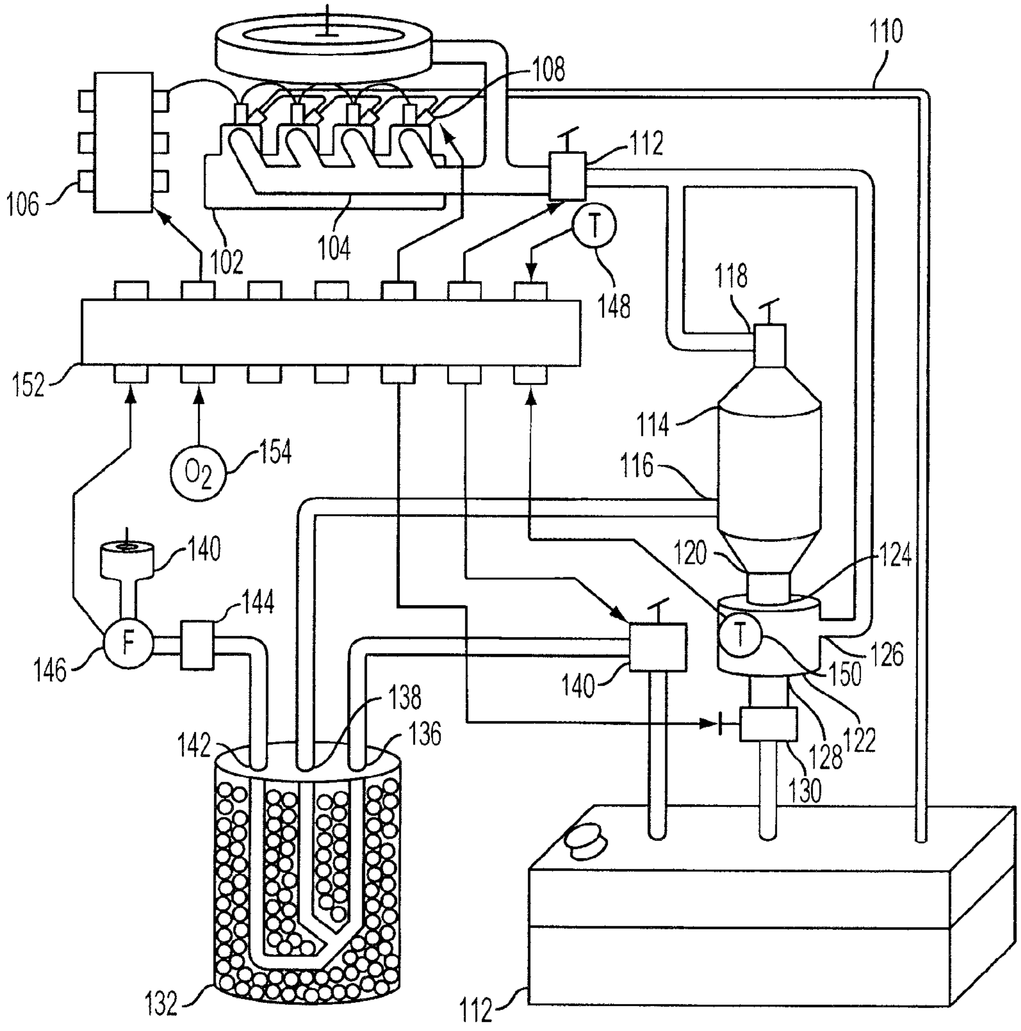
FIG. 1 shows an example fuel vapor control system including a flow separator and a condenser.

FIG. 1 shows a configuration of vehicle components comprising a fuel-vapor control system in one example embodiment. In particular, FIG. 1 shows engine 102 with intake 104, spark ignition system 106, and a set of fuel injectors 108. Fuel line 110 conducts fuel from fuel tank 112 to fuel injectors 108. FIG. 1 shows flow separator 114 comprising flow separator inlet 116, flow separator warm outlet 118, and flow separator cool outlet 120. FIG. 1 shows condenser 122 comprising condenser inlet 124, condenser gas outlet 126, condenser liquid outlet 128, and condensate return valve 128. FIG. 1 also shows adsorbent canister 132 comprising adsorbent canister air inlet 142, adsorbent canister vapor inlet 136, and adsorbent canister outlet 138. While this example shows an adsorbent canister for storing and releasing fuel vapors, various other devices may be used.

In the example embodiment of FIG. 1, adsorbent canister outlet 138 communicates with flow separator inlet 116, and flow separator cool outlet 120 communicates with condenser inlet 124. Condenser gas outlet 126 and flow separator warm outlet 118 both communicate with intake 104 through purge valve 112. Fuel tank 112 communicates with condenser liquid outlet 128 through condensate return valve 130 and with adsorbent canister vapor inlet 136 through fuel vapor control valve 140. Adsorbent canister air inlet 142 communicates with air filter 140 through matrix 144 and leak detector 146.

Figure 2:
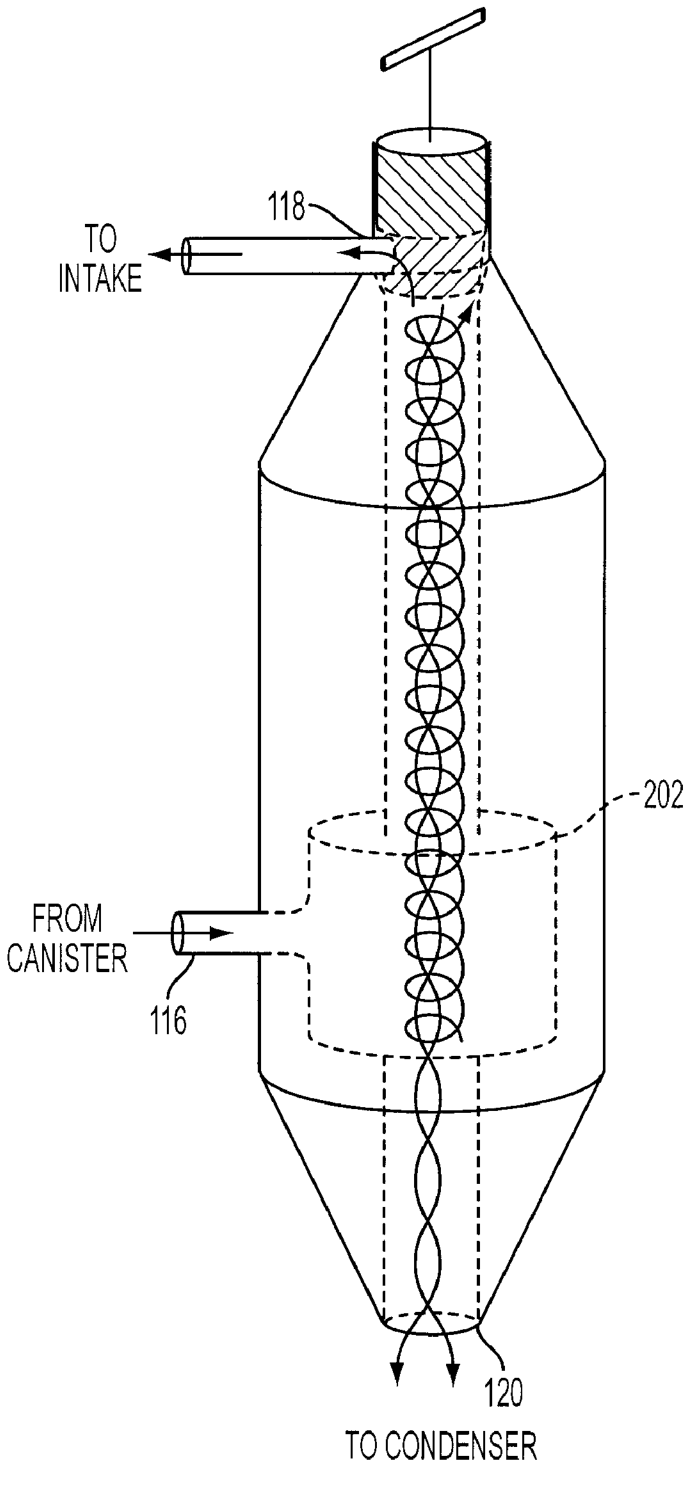
FIG. 2 shows details of an example flow separator.

FIG. 2 is a cut-away diagram of flow separator 114 in one example embodiment. This drawing shows flow separator internal cavity 202, adjustment valve 204, and other components identified above. The shapes, sizes, and relative positions of the internal cavity, the inlet, and the outlets are such as to separate a gas flow entering the inlet into two flows exiting the outlets, with the flow through flow separator warm outlet 118 becoming warmer than the inlet flow and the flow through flow separator cool outlet 120 becoming cooler than the inlet flow. In this example, simultaneous heating and cooling may be achieved using the vortex effect, a phenomenon in the field of fluid dynamics. The flow separatory may be formed in a tube shape in one example. Further, the inlet gas flow may be delivered at a higher pressure compared with one or both outlets, such as caused by intake manifold vacuum applied to one of the outlets. The inlet flow may be delivered tangentially into a swirl chamber in the tube and accelerated to a higher rate of rotation. Further, a conical nozzle at the end of the tube such that only the outer shell of the higher pressure gas is allowed to escape at one end. The remainder of the gas is forced to return in an inner vortex of reduced diameter within the outer vortex to the opposite end of the tube. Further, in some examples, the separate may act to somewhat buffer changes in the vapor concentration emitted from the canister.

It should also be understood that flow separators of alternate shapes and configurations may be used in place of the one shown in FIG. 2.

Further, the configurations of FIGS. 1 and 2 are example embodiment that may be modified in various ways. For example, various valve positions may be moved and/or valves eliminated and/or additional valves added. Further, various additional elements in the various flow paths may be added. As just an example, In particular, adjustment valve 204 used to control flow separation in the system, may be eliminated.

Additionally, while FIG. 1 shows various example paths from the fuel tank to the separator, and back, and from the separator to the intake of the engine, various modifications may be made. For example, the cooler outlet of the separator may be coupled directly back to the fuel tank in one example. As another example, the warmer outlet of the separator may be coupled directly to an intake manifold of the engine (e.g., downstream of a throttle valve in the engine intake system).

Figure 3:
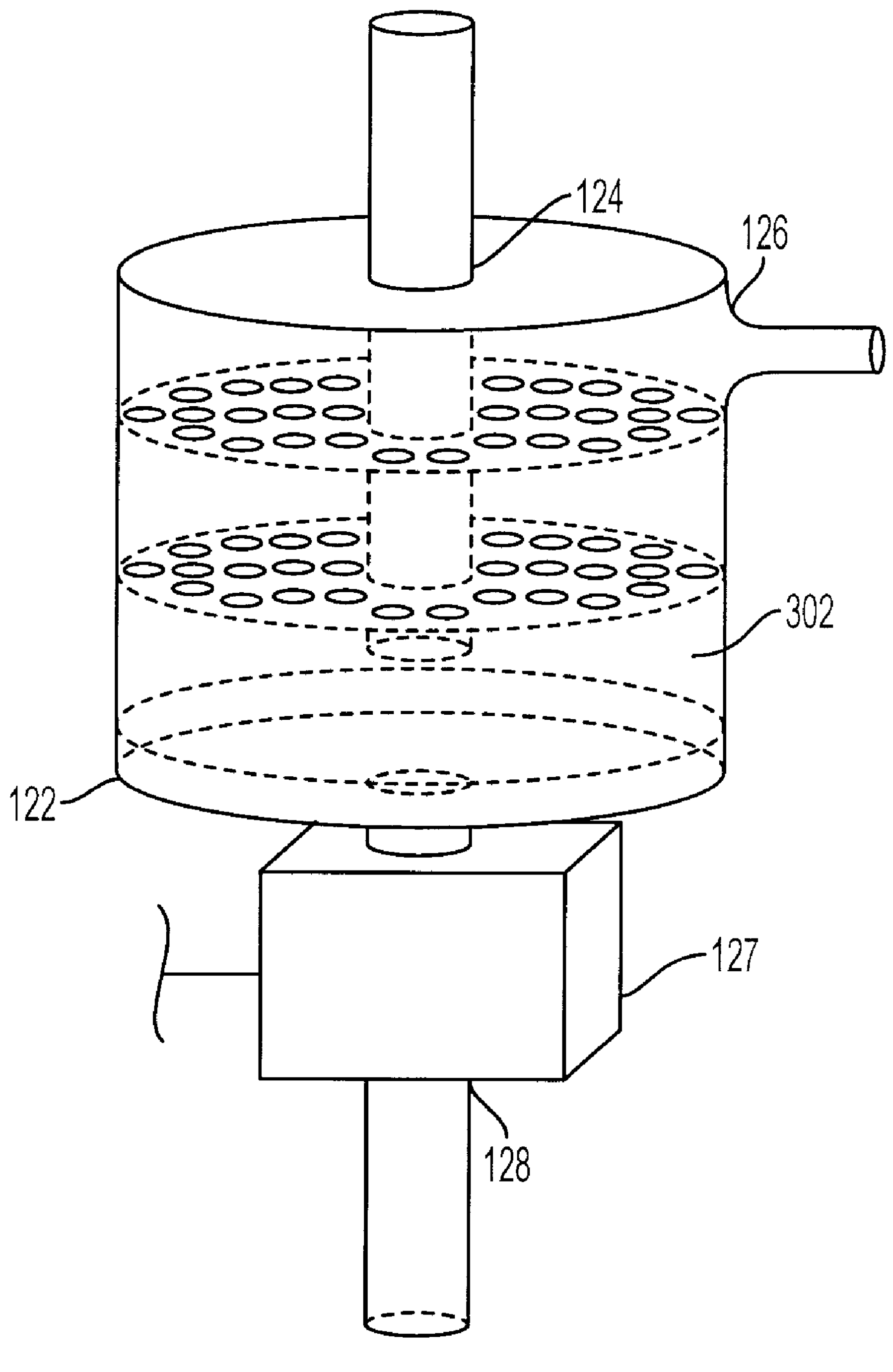
FIG. 3 shows details of an example condenser.

FIG. 3 is a cut-away diagram of condenser 122 in one example embodiment. This drawing shows internal cavity 302 and other components identified above. In this example, internal cavity 302 contains perforated baffles to provide surface area to assist the liquefaction of fuel vapor components. In this example, condenser 122 is made of a thermally conductive material such as aluminum to promote the transfer of heat from the condensing vapor to the surroundings. It should be understood, however, that alternative condenser structures may be used to a space for fuel vapor to liquefy. For example, the return path for the cooler flow to the fuel tank may be configured with tubing in such a configuration that ambient air provides sufficient cooling to condense fuel vapors and deliver them to the tank via gravity.

Returning to the description of FIG. 1, the example embodiment includes two temperature sensors: purge valve temperature sensor 148, which registers the temperature of purge valve 112, and condenser temperature sensor 150, which registers the temperature of condenser 122. Shown also in FIG. 1 is electronic control system 152 configured to receive and process data from sensors in the vehicle, which include temperature sensors 148 and 150 and exhaust-stream oxygen sensor 154. Electronic control system 152 is also configured to actuate certain electronically controlled valves in the vehicle, which include fuel injectors 108, purge valve 112, fuel vapor control valve 140, and condensate return valve 128. The electronically controlled valves listed above may be solenoid-controlled valves, or they may be pneumatic or vacuum actuated valves or some combination of these. Further, one or more of the valves may be actuated by electronically controlled stepper motors. The actuation of electronically controlled valves and the functioning of electronic control system 152 are described with reference to the respective operating modes of the system in FIG. 5 and below.

Adsorbent canister 132 is represented schematically in FIG. 1 to include a single purgeable chamber containing activated carbon pellets. Alternate structures may also be used, however, including multi-chambered canisters and canisters containing different adsorbents. In other embodiments, the single canister shown in FIG. 1 may be replaced by a plurality of adsorbent canisters connected in series or in parallel.

The vehicle components illustrated in FIG. 1 may be configured to enable at least three different operating modes related to fuel vapor storage and purging. Such modes include an adsorption mode, a canister purge mode, and a condensate return mode. The functional features of these modes, according to one example embodiment, are illustrated schematically in FIG. 4 and are further described herein. The functioning of electronic control system 152 in each mode, according to the same example embodiment, is illustrated in FIG. 5 by way of a flow chart.

Figure 4:
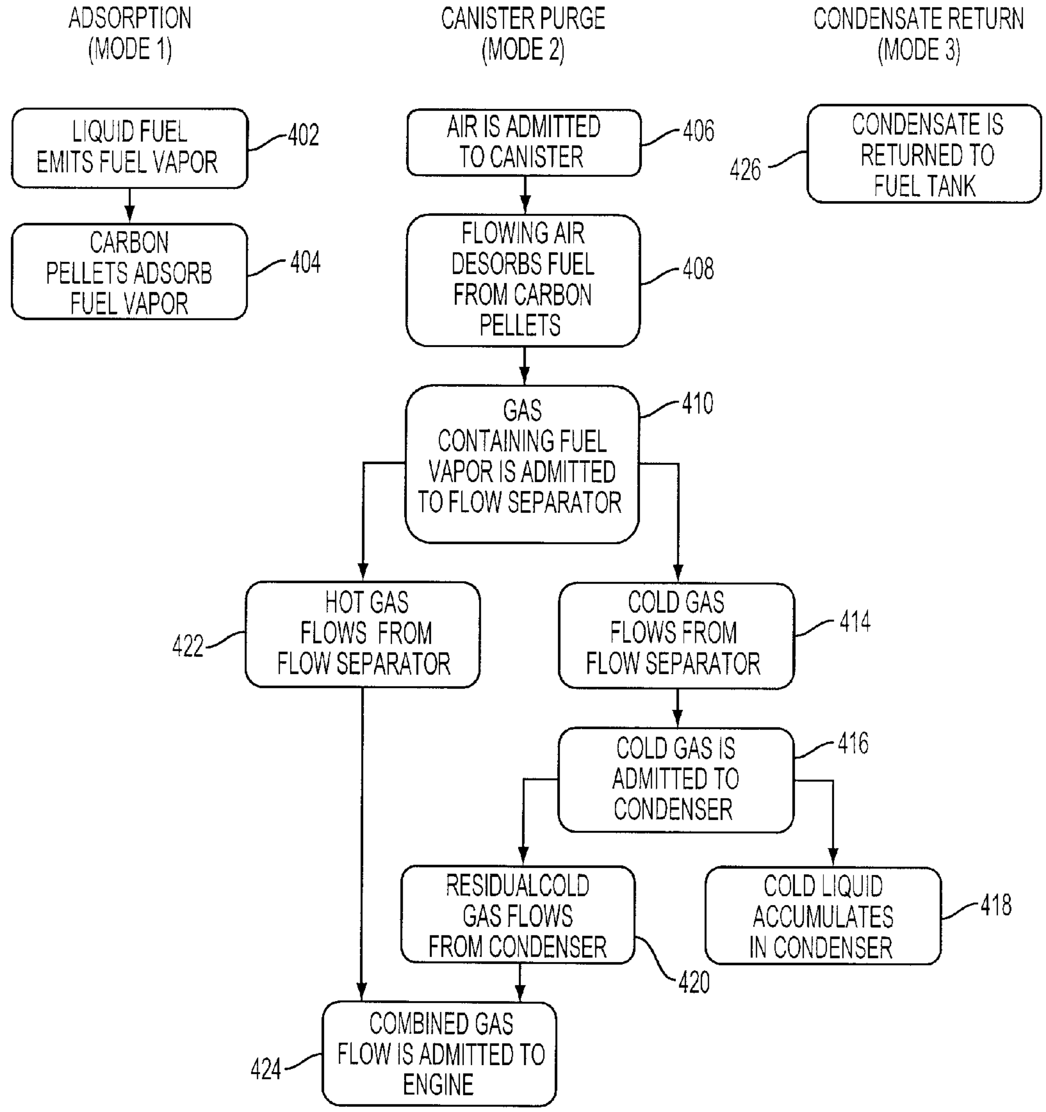
FIG. 4 illustrates system operating modes of an example fuel-vapor control system.
Figure 5:
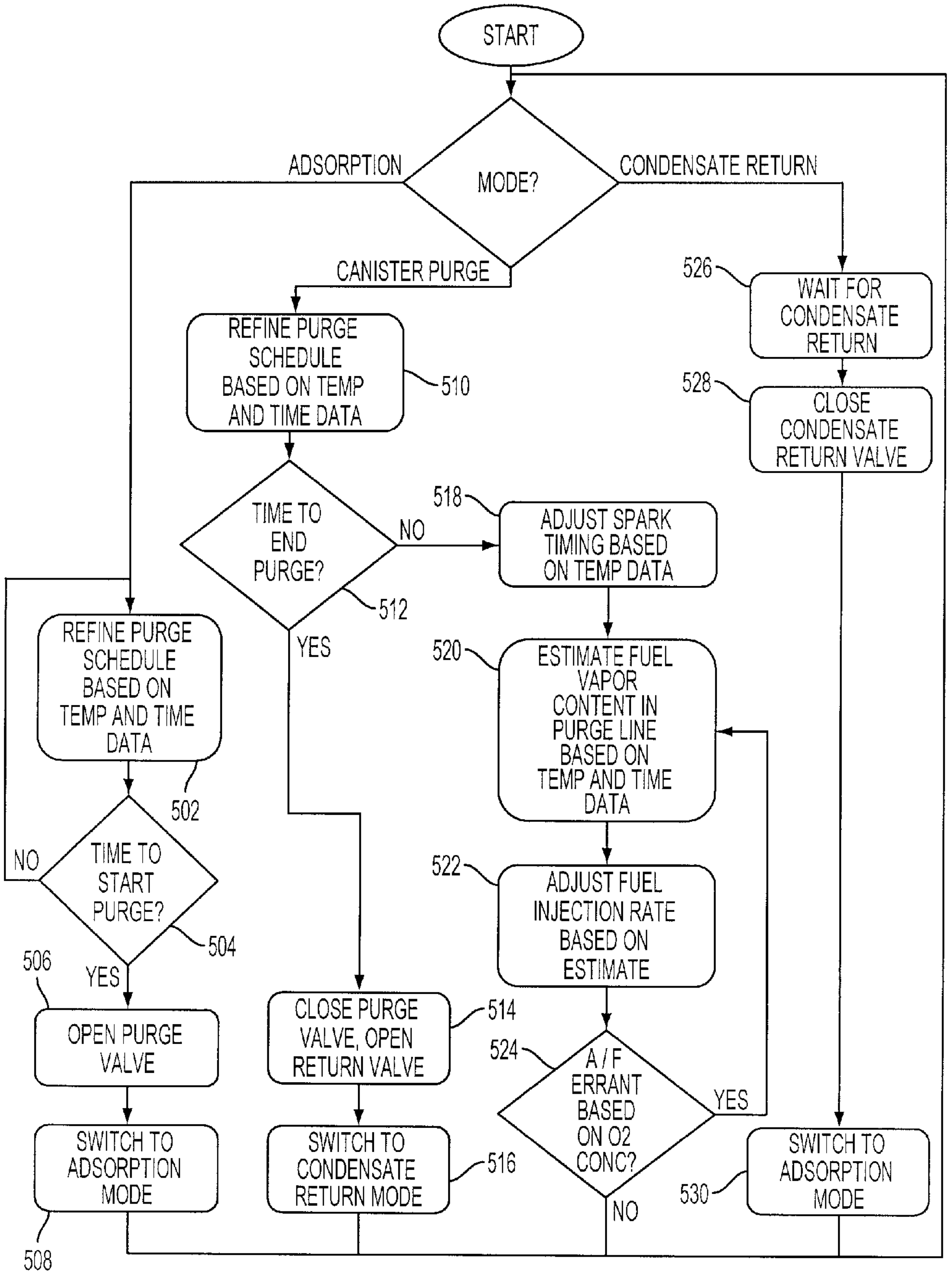
FIG. 5 illustrates operations of an example electronic control system.

FIG. 4 items 402-404 illustrate adsorption mode, wherein fuel vapor is continuously or intermittently emitted from the liquid fuel in fuel tank 112. In this mode, purge valve 112 is held closed. When purge valve 112 is closed, gas containing fuel vapor passes through fuel vapor control valve 140 and into vapor inlet 136 of adsorbent canister 132, where fuel vapors are adsorbed by the adsorbent contained therein. The pressure inside the adsorbent canister is maintained close to atmospheric pressure because adsorbent canister air inlet 142 communicates with air inlet filter 140. During this mode, valve 140 may be adjusted to vary the amount of flow admitted to the canister 132.

FIG. 4 items 406-424 illustrate canister purge mode. In this mode, gas flows from flow separator warm outlet 118 and condenser gas outlet 126 through purge valve 112 and is admitted to intake 104, which is maintained at reduced pressure by engine 102. As a result, air from the atmosphere flows into air inlet filter 140, through leak detector 146 and matrix 144, and into adsorbent canister 132. Such air flow effects desorption of adsorbed fuel from the adsorbent. Flowing air, now mixed with desorbed fuel vapor is referred to as the purge stream. The purge stream exits the adsorbent canister through adsorbent canister outlet 138 and enters flow separator inlet 116. From there, the purge stream enters flow separator internal cavity 202, where it is separated into two flows: a lower-volume flow that exits flow separator warm outlet 118 and a higher-volume flow that exits flow separator cool outlet 120. Due to the vortex effect, the lower-volume flow from the warm outlet is warmer than the admitted purge stream, and the higher-volume flow from the cool outlet is cooler than the admitted purge stream.

Also during canister purge, effluent from flow separator cool outlet 120 flows through condenser 122 from condenser inlet 124 to condenser gas outlet 126. By the action of flow separator 114, such effluent may have cooled to temperatures at which condensation of one or more fuel vapor components is spontaneous at pressures experienced within condenser 122. If so, such fuel vapor components may liquefy inside the condenser. During canister purge, condensate return valve 128 remains closed, resulting in an accumulation of fuel condensate within condenser 122. Also during canister purge, effluent from condenser gas outlet 126 is combined with effluent from flow separator warm outlet 118 and admitted to intake 104 through purge valve 112, whereupon uncondensed fuel vapor from the purge stream is consumed in engine 102. During this mode, the amount of flow delivered to the engine may be adjusted by varying operation of valve 112.

Thus, in this example, flow separator 114 is used to cool part of the purge flow, and condenser 122 is used to liquefy fuel vapor from the cooled part of the purge flow. In this way, it is possible to reduce the amount of fuel vapor admitted to engine 102 during canister purge while retaining sufficient vapor storage capacity.

FIG. 4 item 426 illustrates condensate return mode, wherein accumulated fuel condensate is delivered to fuel tank 112 under the force of gravity or by pumping, thereby returning to the fuel tank some of the fuel which had escaped due to evaporation.

It should be appreciated that while three modes are described below, in an alternative embodiment, the system may operate in only one or two of the described modes. Alternatively, the system may include still further operating modes. Additionally, only some of the actions and/or function of one or more modes may be carried out in a given operating mode. For example, the condensate return mode may be modified or eliminated in some examples. As another example, FIG. 5 items 502-508 illustrate the functioning of electronic control system 152 during adsorption mode. In adsorption mode, electronic control system 152 repeatedly processes time and temperature data from relevant vehicle sensors and refines an estimate of when the next canister purge is required. When the time comes to initiate canister purge, electronic control system 152 opens purge valve 112 and switches to canister purge mode.

FIG. 5 items 510-524 illustrate the functioning of electronic control system 152 during canister purge mode. In this mode, electronic control system 152 reduces the rate of fuel delivery to fuel injectors 108 to avoid over-rich charging of the engine. In determining the amount by which the nominal rate of fuel delivery is reduced during canister purge, electronic control system 152 processes data that includes the time into the current purge cycle as well as data from exhaust-stream oxygen sensor 154 and condenser temperature sensor 150. Prophetic fuel delivery schedules at three different values of the condenser temperature are shown in FIG. 6 (vide infra).

During canister purge, when the flow separator communicates with the engine intake, the purge flow is subject to heating and cooling from system components that include flow separator 114. As transient temperature variations at the intake of an engine are known in the art to increase the likelihood of pre-ignition or knock in spark-ignition engine systems, and as such phenomena can be mitigated by retarding spark delivery to the cylinder, electronic control system 152 may be configured to adjust the timing of spark ignition system 106 in response to the temperature of purge valve temperature sensor 148 (FIG. 5, 518) and operation of the separator. In other embodiments, engine 104 may operate by compression-ignition mode and would require neither spark-ignition system 106 nor electronic control thereof, and in such case timing of fuel delivery may be adjusted responsive to the temperature of fuel vapor purging flow delivered form the separator to the intake.

After the prescribed canister purging time has elapsed, electronic control system 152 closes purge valve 112, opens condensate return valve 130, and initiates condensate return mode (FIG. 5, 514-516). This action allows accumulated fuel condensate to flow into fuel tank 112 under the force of gravity. After waiting a prescribed period of time for fuel condensate to drain back into fuel tank 112, electronic control system 152 closes the condensate return valve and switches back to adsorption mode (FIG. 5, 526-530). In this example, accumulated fuel condensate is gravity fed back into fuel tank 112, but in other embodiments, a pump actuated by electronic control system 152 may be used to return fuel to the fuel tank during condensate return mode. Also, rather than waiting a prescribed period of time, the control system may close the return valve and change operating modes based on other sensor readings and/or operating conditions, such as based on whether the canister has reached a predetermined storage capacity, for example.

Figure 6:
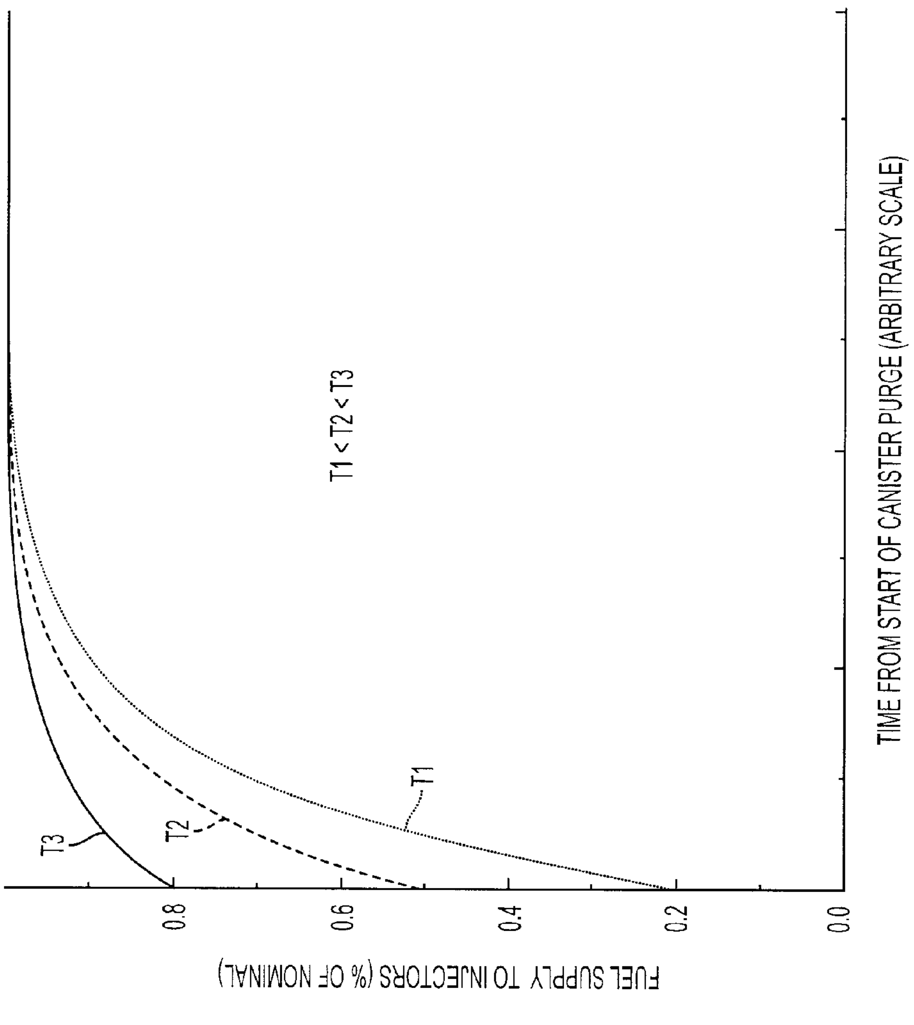
FIG. 6 shows, in one example, a prophetic schedule of fuel delivery to fuel injectors at three different condenser temperatures ($T_1$, $T_2$, $T_3$).

With reference to FIG. 6, it shows some example fuel delivery schedules during canister purge mode. The rate (I) of fuel delivery to a vehicle's fuel injectors may be subject to a correction term (C) that reflects the amount of fuel vapor supplied to the intake during canister purge. The vehicle's electronic control system may estimate C as a function of various system variables. These may include the time since the last canister purge, the temperature of the adsorbent canister, the time into a current canister purge and the reading of an exhaust-stream oxygen sensor. Typically, C may be maximum at the start of canister purge, then gradually decrease with time as the fuel vapor content of the adsorbent canister is depleted. In the hypothetical configuration in which adsorbent canister outlet 138 is shunted directly to purge valve 112, C is nominal and gives rise to a nominal rate of fuel delivery, $$I=N-C, \tag{1}$$

where N is a nominal request rate—a function of engine load, accelerator depression, etc.

With flow separator 114 and condenser 122 included in the configuration of vehicle components, as in FIG. 1, C may be decreased by a factor R, the branching ratio of fuel vapor admitted to engine 102 to fuel vapor discharged from adsorbent canister 132. In this case, $$I=N=C/R, \tag{2}$$

R may depend on the purge flow rate and on the temperature difference between adsorbent canister 132 and condenser 122. For a constant value of the purge flow rate and a constant value of the temperature of adsorbent canister 132, R may decrease (from unity) with decreasing temperature of condenser 122. Therefore, with flow separator 114 and condenser 122 included in the configuration of vehicle components, the rate of fuel supply to fuel injectors 108 may be increased over its nominal schedule. Thus, electronic control system 152 may be configured to increase fuel supply to fuel injectors 108 in response to decreasing temperature of condenser 122 and to decrease fuel supply in response to increasing temperature as illustrated in FIG. 6.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various steps, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated steps, functions, or acts may be repeatedly performed depending on the particular strategy being used. Further, the described steps, functions, and/or acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A system for managing fuel-vapor emission from a fuel tank of a vehicle, the system comprising:

- a vortex-effect, flow-separator tube having a warmer-flow outlet arranged downstream of a conical nozzle at a first end of the tube, a cooler-flow outlet arranged at a second end of the tube, opposite the first end, and an inlet to which an inlet gas flow entraining fuel vapor is admitted, the flow-separator tube configured to warm a gas flow emerging from the warmer-flow outlet and to cool a gas flow emerging from the cooler-flow outlet;
- a first path coupling the warmer-flow outlet to an intake of an engine of the vehicle;
- a second path coupling the cooler-flow outlet to the fuel tank; and
- a third path coupling the fuel tank to the inlet.

2. The system of claim 1, wherein the second path includes a liquefaction space for the fuel vapor to liquefy to form a condensate, and a first valve through which the condensate is controllably admitted from a first space to the fuel tank, and further comprising a second valve through which the gas flow emerging from the warmer-flow outlet flow is controllably admitted to the intake, and a purgeable, fuel-vapor adsorbing device coupled in the third path.

3. The system of claim 2 further comprising an electronic control system configured to adjust a rate of fuel delivery to a fuel injector of the engine in response to an amount of fuel vapor being admitted to the engine.

4. The system of claim 3, wherein the electronic control system is further configured to register a temperature and adjust one or more of a spark-ignition timing and a fuel-injection timing in response to the temperature.

5. The system of claim 4 wherein the control system is configured to adjust one or more of a spark-ignition timing and a fuel-injection timing of the engine in response to whether the warmer-flow outlet is communicating with the intake of the engine.

6. A method to return evaporated fuel to a fuel tank of a vehicle, the method comprising:

- admitting a fuel-vapor entraining gas flow to an inlet of a vortex-effect, flow-separator tube, the flow-separator tube having a warmer-flow outlet arranged downstream of a conical nozzle at a first end of the tube, and a cooler-flow outlet arranged at a second end of the tube, opposite the first end;
- warming a gas flow emerging from the warmer-flow outlet;
- cooling a gas flow emerging from the cooler-flow outlet;
- condensing fuel vapor in the gas flow emerging from the cooler-flow outlet to form a condensate; and
- delivering the condensate to the fuel tank.

7. The method of claim 6, wherein admitting the fuel-vapor entraining gas flow to the inlet comprises admitting from a purgeable, fuel-vapor adsorbing device.

8. The method of claim 6, further comprising admitting the gas flow emerging from the warmer-flow outlet to an intake of an engine of the vehicle, and, adjusting a rate of fuel delivery to a fuel injector of the engine in response to an amount of fuel vapor admitted to the intake.

9. The method of claim 6, further comprising registering a temperature and adjusting one or more of a spark-ignition timing and a fuel-injection timing of the engine in response to the temperature.

10. The method of claim 6, further comprising adjusting one or more of a spark-ignition timing and a fuel-injection timing of the engine based on whether the warmer-flow outlet is communicating with the intake.

11. A method to deliver fuel to an engine of a vehicle, the method comprising:

- admitting a fuel-vapor entraining gas flow to an inlet of a vortex-effect, flow-separator tube, the flow-separator tube having a warmer-flow outlet arranged downstream of a conical nozzle at a first end of the tube, and a cooler-flow outlet arranged at a second end of the tube, opposite the first end;
- warming a gas flow emerging from the warmer-flow outlet;
- cooling a gas flow emerging from the cooler-flow outlet;
- condensing fuel vapor in the gas flow emerging from the cooler-flow outlet to form a condensate; and
- admitting the gas flow emerging from the warmer-flow outlet to an intake of the engine.

12. The method of claim 11, wherein admitting the fuel-vapor entraining gas flow to the inlet comprises admitting from a purgeable, fuel-vapor adsorbing device.

13. The method of claim 11, further comprising adjusting a rate of fuel delivery to a fuel injector of the engine in response an amount of fuel vapor admitted to the intake.

14. The method of claim 11, further comprising registering a temperature and adjusting one or more of a spark-ignition timing and a fuel injection timing of the engine in response to the temperature.

15. The method of claim 11, further comprising adjusting one or more of a spark-ignition timing and a fuel-injection timing of the engine based on whether the warmer-flow outlet is communicating with the intake.

16. The method of claim 11, further comprising delivering the condensate to the fuel tank.

17. The system of claim 1, wherein the inlet is located between the first and second ends of the flow-separator tube and configured to deliver the inlet gas flow tangentially to a swirl chamber in the flow-separator tube.

18. The system of claim 1, wherein coupling to the intake of the engine maintains the warmer-flow outlet at a reduced pressure relative to the inlet.

19. The system of claim 3, wherein the electronic control system is further configured to register a temperature and adjust a rate of fuel delivery to a fuel injector of the engine in response to the temperature.

20. The method of claim 6 further comprising maintaining the warmer-flow outlet at a reduced pressure relative to the inlet.

* * * * *